United States Patent
Myers et al.

(10) Patent No.: US 7,722,173 B2
(45) Date of Patent: May 25, 2010

(54) FLUID CONTAINER HAVING A FLUID ABSORBING MATERIAL

(75) Inventors: John A Myers, Corvallis, OR (US); David M. Hagen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

(21) Appl. No.: 11/241,688

(22) Filed: Sep. 29, 2005

(65) Prior Publication Data

US 2007/0070135 A1    Mar. 29, 2007

(51) Int. Cl.
B41J 2/175    (2006.01)
(52) U.S. Cl. .................................................. 347/86
(58) Field of Classification Search ................ 347/86, 347/87
See application file for complete search history.

(56) References Cited

U.S. PATENT DOCUMENTS

| | | | |
|---|---|---|---|
| 4,771,295 A | 9/1988 | Baker | |
| 4,931,811 A | 6/1990 | Cowger | |
| 5,025,271 A | 6/1991 | Baker | |
| 5,631,682 A * | 5/1997 | Takata | 347/86 |
| 5,657,058 A * | 8/1997 | Mochizuki et al. | 347/7 |
| 5,839,595 A * | 11/1998 | Ujita | 220/4.21 |
| 6,095,643 A | 8/2000 | Cook | |
| 6,170,941 B1 * | 1/2001 | Hara et al. | 347/86 |
| 6,186,621 B1 | 2/2001 | Pew | |
| 6,247,803 B1 * | 6/2001 | Kanaya et al. | 347/86 |
| 6,293,663 B1 * | 9/2001 | Koshikawa et al. | 347/86 |
| 6,293,665 B1 | 9/2001 | Pew | |
| 6,328,424 B1 | 12/2001 | Denton | |
| 6,454,387 B1 | 9/2002 | Haldorsen | |
| 6,460,985 B1 | 10/2002 | Olsen | |
| 6,474,798 B1 * | 11/2002 | Shinada et al. | 347/86 |
| 6,595,711 B2 * | 7/2003 | Hill | 400/470 |
| 6,663,234 B2 * | 12/2003 | Roof et al. | 347/86 |
| 6,739,711 B2 * | 5/2004 | Lee et al. | 347/87 |
| 6,899,417 B1 * | 5/2005 | Shinada et al. | 347/86 |
| 7,121,656 B2 * | 10/2006 | Hattori | 347/86 |
| 2001/0009432 A1 | 7/2001 | Olsen | |
| 2002/0021340 A1 | 2/2002 | Olsen | |
| 2004/0113969 A1 | 6/2004 | Kwan et al. | |

FOREIGN PATENT DOCUMENTS

| | | |
|---|---|---|
| EP | 1095777 | 5/2001 |
| EP | 1510347 | 3/2005 |
| JP | 7016872 | 1/1995 |
| JP | 10100426 | 4/1998 |
| JP | 2005007713 | 1/2005 |
| WO | WO 99/56960 | 11/1999 |

OTHER PUBLICATIONS

Photo: Lexmark 17 Black print cartridge, part No. 10N0217. Photo taken in three different views (approx. perspective, end of cartridge removed, and top view w/lid removed).

* cited by examiner

Primary Examiner—Anh T. N. Vo (57) ABSTRACT

A fluid container includes a body having a depth extending between a base interior surface and an opening of the fluid container. The fluid container also includes a capillary material compression structure having an extension depth extending from the opening to a capillary material where the capillary material compression structure is in contact with the capillary material, and the ratio of the extension depth to the depth is 0.35 or greater.

31 Claims, 7 Drawing Sheets

FLUID CONTAINER HAVING A FLUID ABSORBING MATERIAL

BACKGROUND

Description of the Art

Substantial developments have been made in the micromanipulation of fluids in fields such as electronic printing technology using inkjet printers.

Currently there is a wide variety of highly efficient inkjet printing systems in use, which are capable of dispensing ink in a rapid and accurate manner. Generally a printhead is mounted to a carriage that is moved back and forth across a print media, a print controller activates the printhead to deposit or eject ink drops onto the print media to form images and text. Ink may be delivered to the printhead by an ink supply that is either carried by the carriage or mounted to the printing system in a fixed manner, typically, with a flexible ink delivery system connected between the supply and the printhead.

There has been a demand by consumers for ever-increasing improvements in speed, image quality and lower cost in printing systems. In an effort to reduce the size of ink jet printers and to reduce the cost per printed page, efforts have been made to optimize the performance of three basic configurations: 1) print cartridges with integral reservoirs, 2) small semi-permanent or permanent printheads with replaceable ink reservoirs mounted on the printheads, and 3) small semi-permanent or permanent printheads with a fixed ink supply that is either continuously connected or intermittently connected to the printhead. For the last case the ink supply is mounted off of the carriage and either connected to the printhead via a flexible conduit providing continuous replenishment or else intermittently connected by positioning the printhead proximate to a filling station that facilitates connection of the printhead to the ink supply. In the first case the entire printhead and ink supply is replaced when the ink is exhausted. In the second case the ink supply is separately replaceable, and is replaced when exhausted and the printhead may be replaced at the end of printhead life. Regardless of where the ink supply is located within the printing system, it is desirable that the ink supply reliably, efficiently, and cost effectively deliver as much of the total volume of ink contained in the supply to the printhead as possible.

Current ink supply technology continually struggles with maximizing the amount of ink delivered for a given container size while continuing to meet shipping stress and altitude specifications. Consumer demand for cheaper, smaller, more reliable, higher performance devices constantly puts pressure on improving and developing cheaper, and more reliable manufacturing materials and processes. There is an ever present need for ink supplies which make use of low cost materials and are relatively easy to manufacture. In addition, there is a continuing desire for ink containers that are volumetrically efficient producing compact ink supplies that provide for ever smaller printing systems. The ability to optimize fluid ejection systems, will open up a wide variety of applications that are currently either impractical or are not cost effective.

BRIEF DESCRIPTION OF THE DRAWINGS

FIG. 1b is a cross-sectional view along 1b-1b of the fluid container shown in FIG. 1a.

FIG. 1c is a cross-sectional view along 1c-1c of the fluid container shown in FIG. 1a.

FIG. 2b is a cross-sectional view along 2b-2b of the fluid ejection cartridge shown in FIG. 2a.

FIG. 3b is an expanded cross-sectional view of the fluid ejector head shown in FIG. 3a.

FIG. 3c is an expanded cross-section view along 3c-3c of the cartridge crown shown in FIG. 3a.

DESCRIPTION OF THE PREFERRED EMBODIMENTS

This invention is directed to various fluid containers and fluid ejection cartridges that utilize, for fluid containment, a volume of capillary material that is configured to facilitate the reliable flow of fluid from a reservoir as well as utilizing capillary forces to regulate the backpressure of the fluid supply. The present invention utilizes a capillary material compression structure that allows a single fluid container or fluid ejection cartridge to be designed to utilize various sizes or volumes of the capillary material. By varying the size of the capillary material along with the size of the capillary material compression structure the efficient utilization of various amounts of fluid is realized while maintaining compression between the capillary material and a fluid outlet. For example, by minimizing the size or effective volume displaced by the capillary material compression structure and maximizing the size or volume of the capillary material the maximum fluid capacity of the reservoir is achieved. In comparison, by increasing the size or effective volume displaced of the capillary material compression structure and decreasing the size or volume of the capillary material a continuous variation in the capacity of the reservoir is achieved at a lower cost because the volume of capillary material utilized is decreased. Thus, with a single fluid container or fluid ejection cartridge the amount of fluid added can be varied while efficiently utilizing that fluid, reducing the cost of the capillary material used, and still regulating the backpressure of the fluid supply without the need for multiple sized reservoirs.

The present invention advantageously utilizes the capillary material compression structure to partition the fluid reservoir into at least an effectively displaced capillary fluid volume and a capillary fluid volume. In alternate embodiments the present invention further partitions the fluid reservoir into free fluid compartments with each compartment defined by various combinations of the peripheral walls of the container, compartment sidewalls, and a surface of the capillary material. Each compartment sidewall has a compression region that is in contact with the capillary material. The volume of capillary material defines a fluid capillary volume of the container or cartridge. The combination of the volume of capillary material and the volume of free fluid compartments defines the useable fluid volume of the reservoir.

The present invention reduces the amount of capillary material utilized to provide a given amount of fluid to a customer. Since up to about twenty percent of the fluid absorbed by the capillary material may remain in the material at the end of life, by reducing the amount of capillary material utilized, a higher percentage of the volume of fluid contained in the container or cartridge can be dispensed, i.e. the amount of fluid filled may be increased by the amount held in the free fluid chamber, but the amount of fluid stranded in the container or cartridge is not increased and is generally reduced, thereby providing for higher percentage of the volume of fluid contained to be dispensed. In addition, the present invention allows the use of less expensive simple geometric shapes of capillary material such as simple cylinders, cubes, and rectangular shapes rather than more complex shapes that fill the entire volume of the container or cartridge.

It should be noted that the drawings are not true to scale. Further, various elements have not been drawn to scale. Certain dimensions have been exaggerated in relation to other dimensions in order to provide a clearer illustration and understanding of the present invention. In particular, vertical and horizontal scales may differ and may vary from one drawing to another. In addition, although some of the embodiments illustrated herein are shown in two dimensional views with various regions having height and width, it should be clearly understood that these regions are illustrations of only a portion of a device that is actually a three dimensional structure. Accordingly, these regions will have three dimensions, including length, width, and height, when fabricated on an actual device.

Moreover, while the present invention is illustrated by various embodiments, it is not intended that these illustrations be a limitation on the scope or applicability of the present invention. Further, it is not intended that the embodiments of the present invention be limited to the physical structures illustrated. These structures are included to demonstrate the utility and application of the present invention to presently preferred embodiments.

Figure 1A:
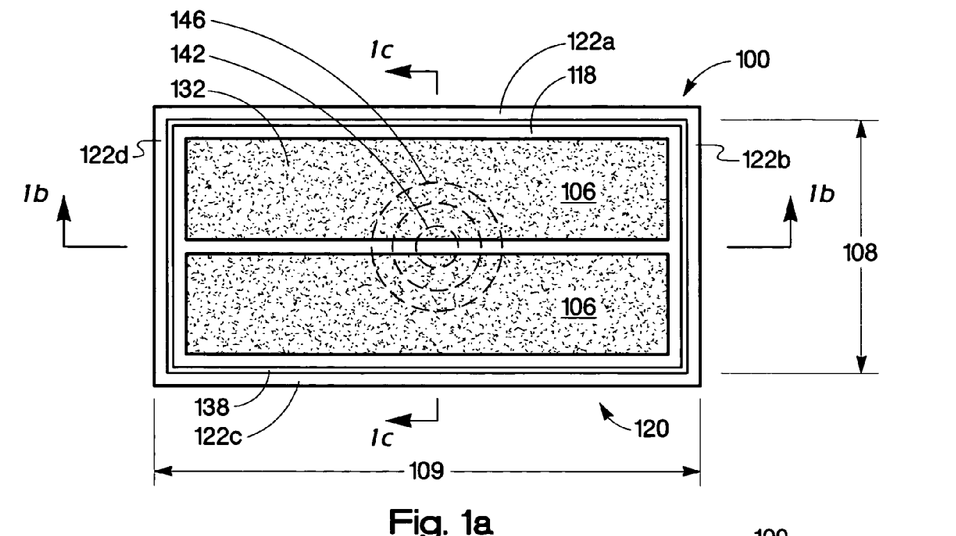
FIG. 1a is a top plan view of a fluid container according to an embodiment of the present invention.

A top plan view of an embodiment of fluid container 100 employing the present invention is illustrated in FIG. 1a. In this embodiment, fluid container 100 includes body 120 configured to contain a fluid. Body 120 has straight or vertical body sidewalls 122a, 122b, 122c, and 122d; however, in alternate embodiments, body 120 may have sloping sidewalls that provide for easy insertion of a capillary material such as capillary material 132. In addition, although body 120 is depicted as having a rectangular shape, body 120 may have any of a variety of different shapes and configurations. In this embodiment, body 120 is formed by injection molding utilizing a polyethylene terephthalate polymer (PET) that is 15 percent filled with glass; however, in alternate embodiments, any suitable metal, glass, ceramic, or polymeric material that is compatible with the fluid being stored also may be utilized. For example, polypropylene, polyethylene, liquid crystal polymers, glass, stainless steel, and aluminum are just a few materials that also may be utilized to form body 120.

Figure 1B:
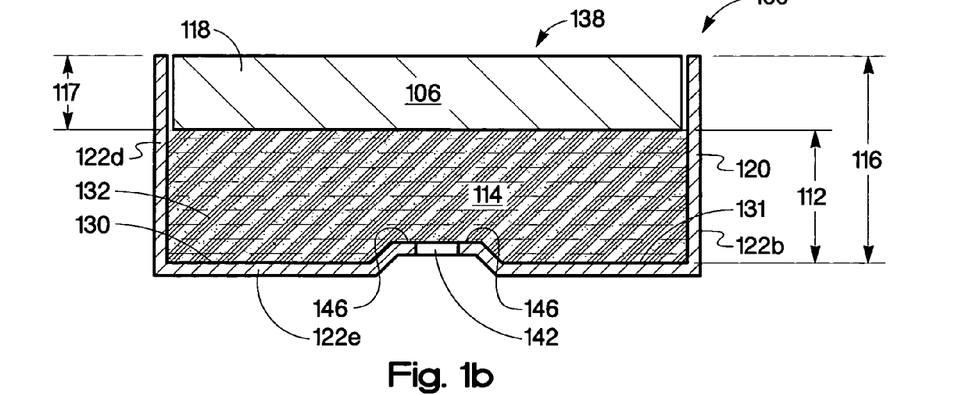
Figure 1C:
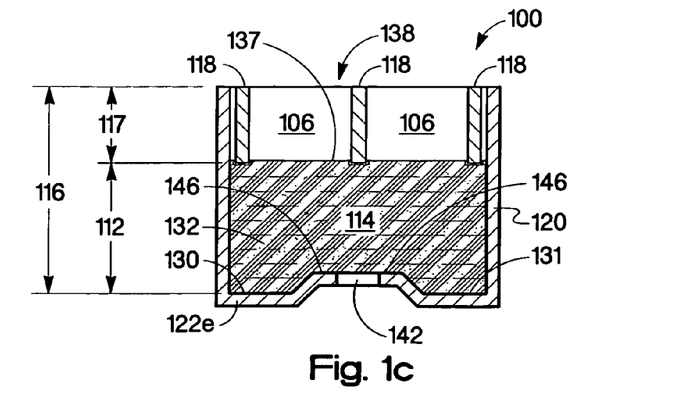

Fluid container 100 also includes capillary material stop 131 on which capillary material 132 is supported, and capillary material compression structure 118 disposed between opening 138 and top surface 137 of capillary material 132 (See FIG. 1c). Capillary material stop 131, in this embodiment is formed by base interior surface 130 of body sidewall 122e of body 120. In this embodiment, effective displaced volume 106 is formed by extension depth 117 of capillary material compression structure 118 and internal body width 108 and internal body length 109, while capillary fluid volume 114 is formed by capillary material depth 112 and internal body width and length 108 and 109 respectively. The volume between capillary material stop 131 or base interior surface 130 and opening 138 is the maximum effective capillary fluid volume for fluid container 100. This maximum effective capillary fluid volume is formed by internal body depth 116 and internal body width and length 108 and 109 respectively. Thus, in this embodiment, the maximum effective capillary fluid volume is reduced by effective displaced volume 106. In addition, body 120 further includes fluid outlet 142 formed in body sidewall 122e through which fluid held in container 100 is dispensed as illustrated in FIG. 1b.

As illustrated, in a cross-sectional view, in FIG. 1c outlet compression surface 146 formed proximate to fluid outlet 142 generate a compressive region in the capillary material proximate to the fluid outlet. When capillary material 132 and capillary material compression structure 118 are fully inserted, into body 120, a compressive region in the capillary material proximate to compression surface 146 is formed. This compressive region increases the capillarity of the cells or pores in this region by creating a region of smaller-sized pores that have a bubble pressure greater than the backpressure in the fluid container thereby generating an air barrier in the capillary material. The compression region formed by compression surface 146 substantially reduces the possibility of an air path penetrating from above capillary material top surface 137 along one of the side walls of body 120 or through the capillary material. These compression regions allow for the efficient utilization of more of the fluid originally contained in the fluid container, thus leaving substantially less stranded fluid in fluid container 100. This coupled with the utilization of the capillary material compression structure allows the same container to efficiently deliver various volumes of fluid as well as providing lower manufacturing cost by allowing smaller volumes of capillary material to be utilized with the same body when less than the maximum amount of fluid is desired to be utilized. In this manner the efficient delivery of fluid can be tailored to the particular end function in which the fluid will be utilized.

Figure 2A:
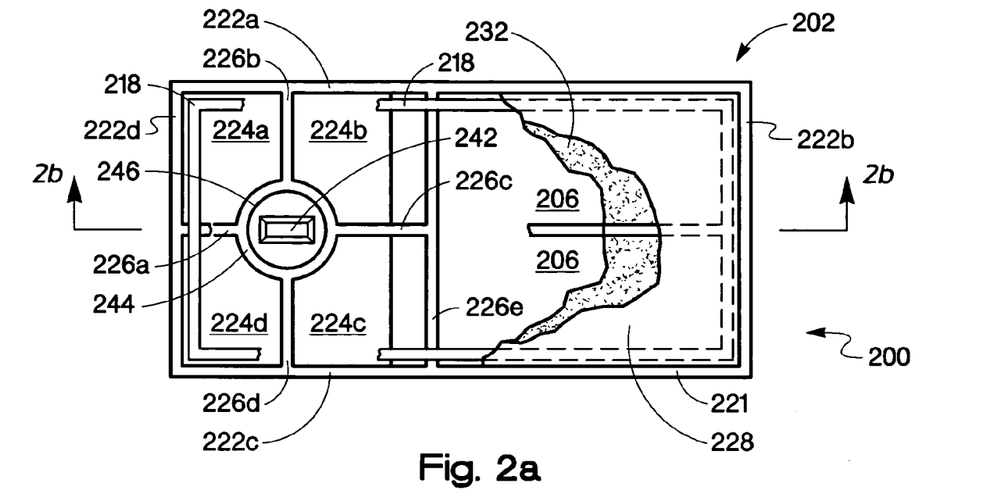
FIG. 2a is a top plan view of a fluid ejection cartridge according to an exemplary embodiment of the present invention.

An exemplary embodiment of the present invention is shown in a top plan view in FIG. 2a where fluid container 200 is an integral part of fluid ejection cartridge 202. In this embodiment, fluid ejection cartridge 202 includes cartridge body 221 having peripheral walls 222a, 222b, 222c, 222d, 222e (see FIG. 2b), and 222f (see FIG. 2b) where the internal surface of peripheral wall 222e forms capillary material stop 231. Cartridge body 221 also includes free fluid volume 215 that is the volume between cartridge free fluid base surface 230 and compression edges 234 excluding the volume of fluid outlet 240. Free fluid volume 215, in this embodiment, is partitioned into free fluid compartments 224a, 224b, 224c, and 224d. Each compartment includes at least one free fluid compartment sidewall 226a-226e. In this embodiment, each free fluid compartment sidewall is flush with the top standpipe wall 244, where the region of each free fluid compartment sidewall that extends above capillary material stop surface 231 forms compression edges 234 as illustrated in a cross-sectional view in FIG. 2b. The volume between cartridge lid 228 and capillary material stop surface 231, except for the portion of the free fluid volume between interior surface 235 and compression edges 234, forms the maximum capillary fluid volume for fluid ejection cartridge 202.

Capillary fluid volume 214, in this embodiment, is approximately formed by capillary material depth 212 and the internal body width and length. That is, capillary fluid volume 214, in the embodiment shown in FIGS. 2a and 2b, does not include the portion of the free fluid volume between base interior surface 235 and compression edges 234. Effective displaced volume 206 is formed by extension depth 217 of capillary material compression structure 218 and the internal body width and length. Thus, the maximum effective capillary fluid volume is partitioned between the capillary fluid volume 214 and effective displaced volume 206.

Figure 2B:
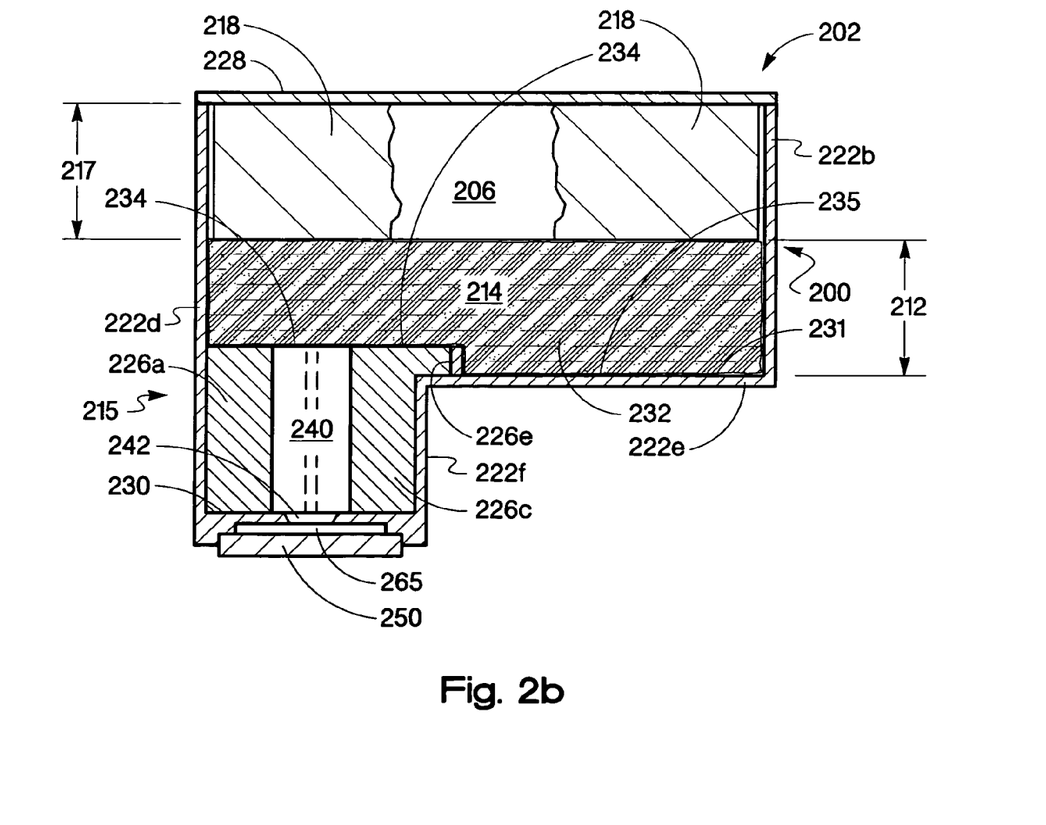

Cartridge body 221 further includes cylindrically shaped standpipe 240 formed by standpipe wall 244. Standpipe 240 typically includes a filter (not shown) mounted to standpipe wall surface 246 to provide filtration of air bubbles and solid particles when fluid flows from the capillary material 232 into standpipe 240. At the base of standpipe 240 fluid outlet 242 provides a fluidic orifice through which fluid held in cartridge body 221 is fluidically coupled to printhead substrate 250 via fluid flow channel 265. Printhead substrate 250 may be any of the wide variety of fluid ejector heads known in the art such as thermal resistor, piezoelectric, flex-tensional, acoustic, and electrostatic. In this embodiment, printhead substrate 250 is a thermal resistor type fluid ejector having a plurality of thermal resistors formed on printhead substrate 250 and a plurality of orifices or nozzles in fluid communication with the thermal resistors. Typically, the free fluid compartment sidewalls increase the rigidity of both the standpipe and the cartridge body in general, providing greater resistance to cracking of the printhead when the print cartridge is subjected to shock such as through inadvertent dropping. In addition, it is advantageous to have the fluid delivery system function properly in the presence of shaking, vibration, trapped air, particle contamination, and a broad range of operating temperatures and pressures.

The structure of the present invention may be compared with other print cartridges that utilize a fluid supply that consists of a unitary cartridge body configured to hold free ink in a printhead support section or snout region and to hold ink in a porous media section of the fluid supply. Generally the other print cartridges utilize an additional sidewall that extends across what we refer to as the internal body width and extends from what we refer to as capillary material stop surface 231 to the opening of the print cartridge thereby reducing the capillary fluid volume of the cartridge by reducing the internal body length. The use of such a wall to reduce the capillary fluid volume generally utilizes different molds for each change in capillary fluid volume desired thereby increasing the cost for varying the volume of fluid filled. In addition, the use of a constant length and width of the capillary material utilized to vary the capillary fluid volume simplifies both the bowl feeders generally utilized as well as the feeding and orientation processes.

Fluid container 200 shown in FIGS. 2a-2b further includes cap or lid 228 having an air vent tube or labyrinth (not shown) formed in the lid for supplying or replenishing air to the internal volume as fluid is removed from the container. In this embodiment, capillary material 218 is generally referred to as polyurethane foam; however, in alternate embodiments, other materials such as bonded polyester fiber (BPF), bonded polypropylene or polyethylene fibers, nylon fibers, or rayon fibers also may be utilized to form capillary material 214. Any material having a surface energy higher than the liquid being stored may be utilized including surface modified materials.

Figure 2C:
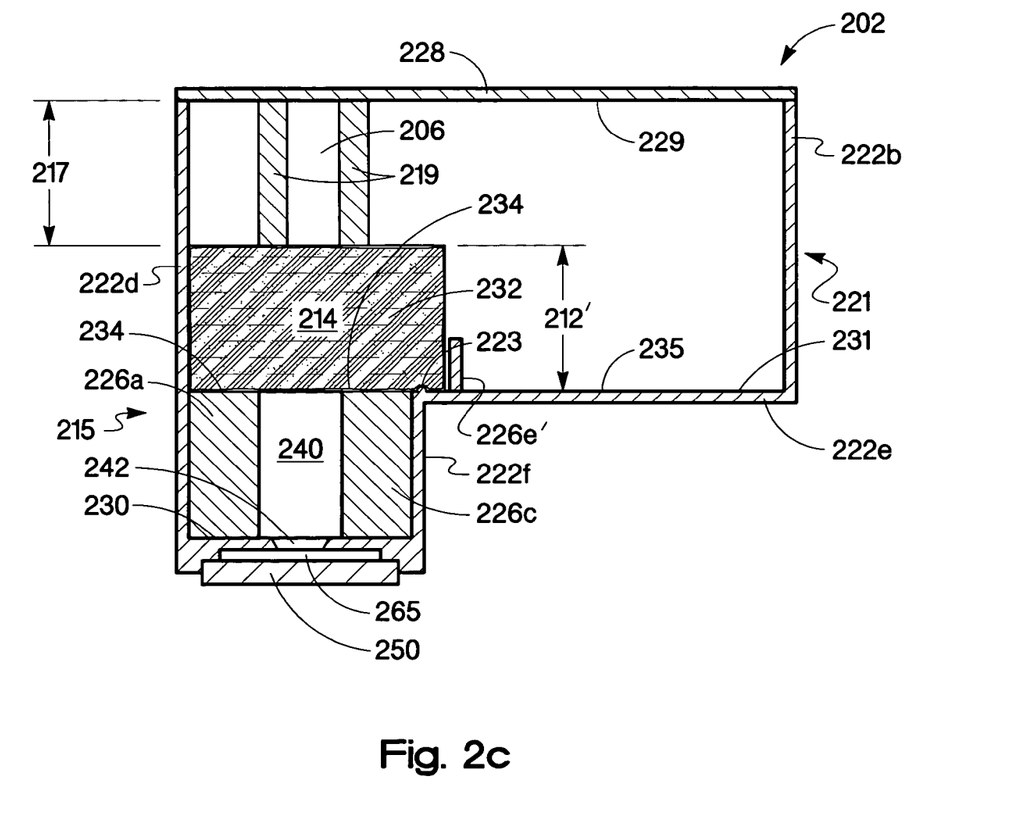
FIG. 2c is a cross-sectional view of a fluid ejection cartridge according to an alternate embodiment of the present invention.

FIG. 2c illustrates, in a cross-sectional view, an alternate embodiment of the present invention where fluid ejection cartridge 202 includes capillary material 232 essentially disposed over free fluid volume 215. In this embodiment, capillary material 232 extends between compartment sidewall 226e' and peripheral wall 222d forming a capillary material length. In addition capillary material 232 extends across the width of fluid ejection cartridge 202 forming a capillary material width. Capillary material 232 also extends between compression edges 234 and the end of cartridge lid extension structures 219 forming a capillary material thickness. Thus, capillary fluid volume 214 is formed by capillary material depth 212', the distance between compartment sidewall 226e' and peripheral wall 222d and the internal width of cartridge body 221. Effective displaced volume 206 is formed by extension depth 217, the distance between compartment side wall 226e' and peripheral wall 222d, and the internal body width of cartridge body 221. Lid extension structure 219 is disposed on cartridge lid interior surface 229 of cartridge lid or crown 228. In this embodiment, the volume bounded between cartridge lid 228, compression edges 234, compartment side wall 226e' and peripheral wall 222d forms the maximum capillary fluid volume for fluid ejection cartridge 202. Cartridge body 221 also includes free fluid volume 215 that is the volume between cartridge free fluid base surface 230 and compression edges 234 excluding the volume of fluid outlet 240. In addition, in this embodiment, compression structure 223 extends across the internal width of cartridge body 221 providing an air barrier along the width of capillary material 232.

Figure 3A:
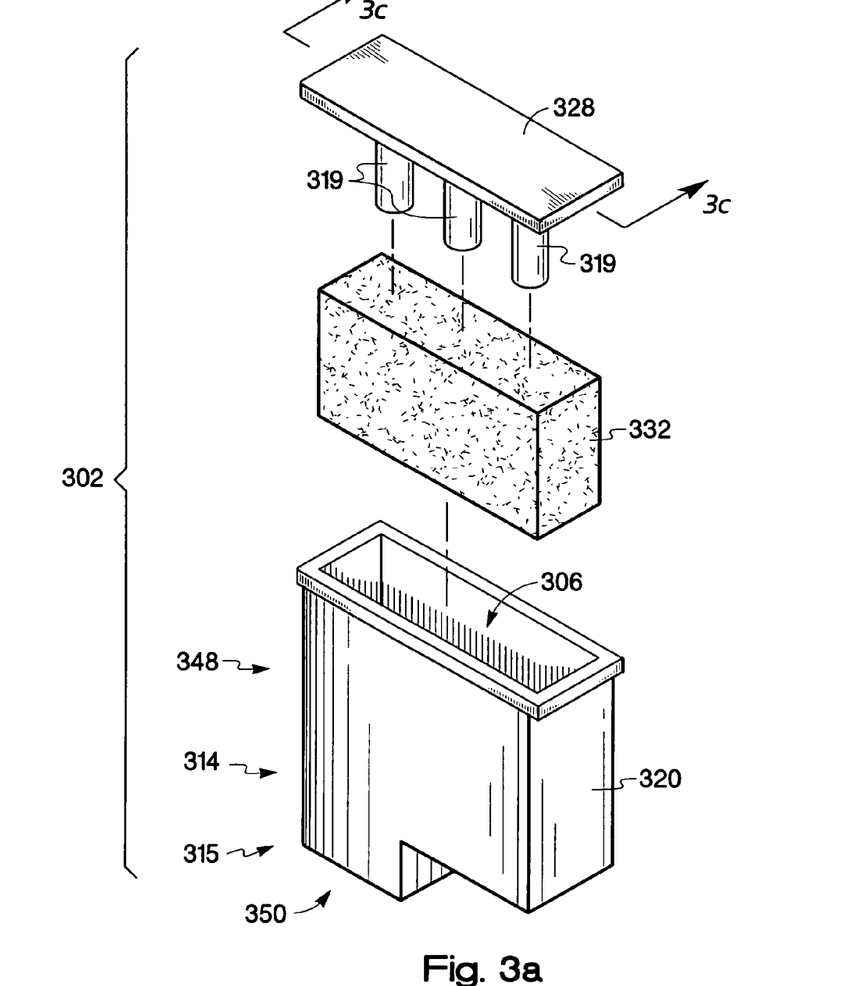
FIG. 3a is an exploded perspective view of an ink jet cartridge according to an exemplary embodiment of the present invention.

FIG. 3a illustrates, in an exploded perspective view, an exemplary embodiment of the present invention where ink jet print cartridge 302 includes reversibly fluid absorbing material 332 disposed within reservoir 348. Print cartridge 302 is configured to be used by a fluid deposition system such as ink jet printing system (not shown) or other fluid dispensing system. Print cartridge 302 includes fluid ejector head 350 in fluid communication with reservoir 348, which supplies fluid, such as ink, to fluid ejector head 350. Print cartridge 302 includes cartridge body 320, reversibly fluid absorbing material 332, and cartridge crown 328 that forms a cap or lid to cartridge body 320. Reservoir 348 has an interior volume configured to contain reversibly fluid absorbing material 332 forming capillary volume 314 disposed between free fluid volume 315 and cartridge crown displaced volume 306.

Figure 3B:
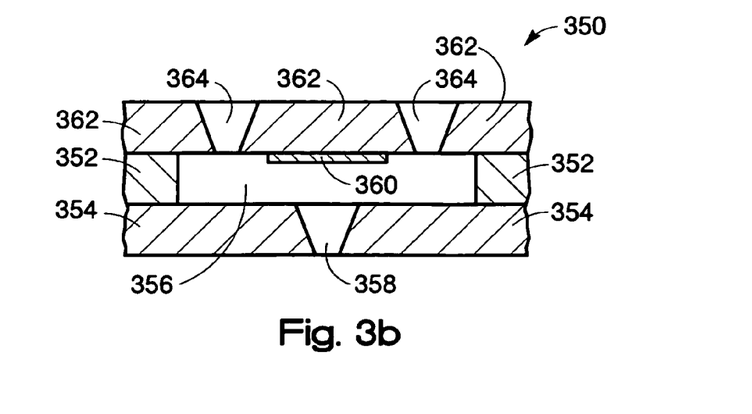
Figure 3C:
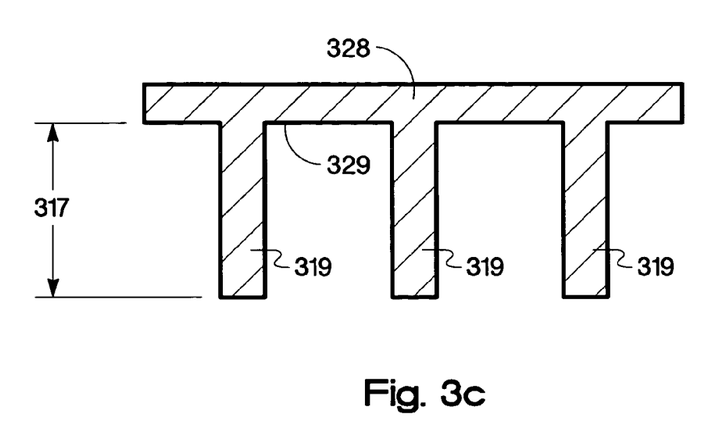

In this embodiment, as shown, in a cross sectional view, in FIG. 3c cartridge crown 328 includes 3 cartridge crown extension structures 319 formed as protrusions extending a distance 317 from major cartridge crown interior surface 329. Cartridge crown displaced volume 306, in this embodiment, is formed by the volume establish by the length and the width of cartridge body 320 and distance 317 that cartridge extension structure 319 extends into reservoir 348. In alternate embodiments, a separate spacer extending a distance 317 from the interior surface of the cartridge crown toward reversibly fluid absorbing material 332 also may be utilized to form displaced volume 306. After assembly of print cartridge 302 is complete cartridge crown extension structures 319 retain and compress reversibly fluid absorbing material 332 disposed within reservoir 348. In alternate embodiments, a wide variety of shapes and number of cartridge crown extension structures 319 also may be utilized including only a single extension structure. For example, a single rib extending from the interior surface of the cartridge crown may be utilized.

In addition, cartridge crown 328 is configured to cooperate with cartridge body 320 to enclose the interior volume and fluid absorbing material 332 disposed within the interior volume. In this embodiment, crown 328 is configured to form a fluidic seal with cartridge body 320; however, in alternate embodiments, other capping and sealing arrangements also may be utilized. Crown 328 also includes a fill port (not shown) that generally comprises an inlet through crown 328, enabling print cartridge 302 to be filled or refilled with fluid.

In addition, the fill port generally includes a mechanism configured to seal the opening provided by the fill port once filling of the print cartridge is completed. In an alternate embodiment, the sealing mechanism may automatically seal any opening formed during the filling process, such as a valving mechanism or a septum. In still another embodiment, the fill port may be configured to be manually closed when not in use. In an alternate embodiment, fluid absorbing material 332 may be encapsulated or surrounded by a fluid impervious film along its outer surfaces. In such an embodiment, cartridge body is configured to puncture, pierce, or in some other manner provide, such as a valving mechanism, a selective fluid communication between the fluid contained and fluid ejector head 350.

A cross-sectional view of fluid ejector head 350 of fluid ejection cartridge 302 is shown in FIG. 3b. Fluid ejector head 350 includes substrate 362 that has fluid ejector actuator 360 formed thereon. Fluid ejector actuator 360, in this embodiment, is a thermal resistor; however, other fluid ejector actuators may also be utilized such as piezoelectric, flex-tensional, acoustic, and electrostatic. Chamber layer 352 forms fluidic chamber 356 around fluid ejector actuator 360, so that when fluid ejector actuator 360 is activated, fluid is ejected out of nozzle 358, which is generally located over fluid ejector actuator 360. Fluid channels 364 formed in substrate 362 provide a fluidic path for fluid in reservoir 348 to fill fluidic chamber 356. Nozzle layer 354 is formed over chamber layer 352 and includes nozzle 358 through which fluid is ejected.

Figure 4A:
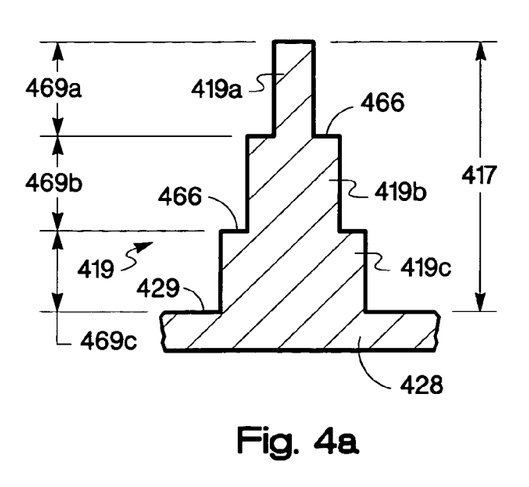
FIGS. 4a-4b are cross-sectional views of lid extension structures according to alternate embodiments of the present invention.
Figure 4B:
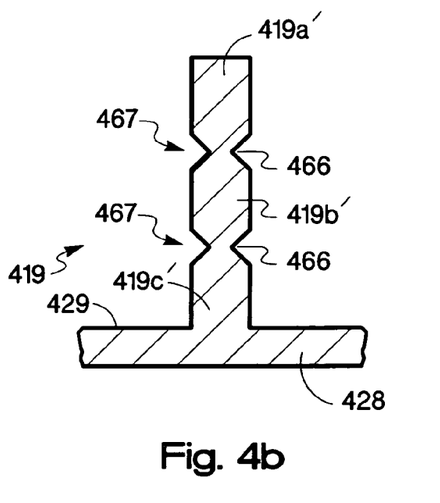

In FIGS. 4a and 4b alternate embodiments of lid extension structures 419 are shown in a cross sectional view. In these embodiments lid extension structure 419 is formed utilizing 3 extension substructures 419a, 419b, and 419c. As shown in FIG. 4a extension substructure 419c is attached to major interior lid surface 429 of lid 428. Extension substructure 419b is then attached to extension substructure 419c and extension substructure 419a is attached to extension substructure 419b. In the embodiment shown in FIG. 4a, extension substructures 419a, 419b, and 419c each have a substructure length 469a, 469b, and 469c respectively. In addition, each substructure, in this embodiment, has a cylindrical shape with a diameter that increases from 419a to 419c. In alternate embodiments, each extension substructure may have the same or different diameter or size as another substructure. Extensions 419a, 419b, and 419c can each be sequentially separated, at substructure separating portion 466, to form various extension depths 417. As illustrated in FIG. 4a extension depth 417 is equal to the sum of substructure lengths 469a-469c. In alternate embodiments, extension substructure 419a may be separated from substructure 419b to provide an extension depth equal to the substructure lengths 469b plus 469c. In one embodiment all three extension substructures are removed to form an extension depth equal to zero. Although for descriptive purposes only FIG. 4a illustrates 3 extension substructures it should be understood that one or more substructures may be utilized. In addition, other shapes such as square, rectangular, oval, and polygonal as just a few examples may also be utilized as well as each substructure may have a different shape. Further, a wide variety of techniques may be utilized to separate the extension substructures including breaking, cutting, sawing, slicing, and grinding as just a few examples.

In the embodiment shown in FIG. 4b, lid extension structure 419 is formed utilizing 3 extension substructures 419a', 419b', and 419c' where the substructures are connected or attached to each other via substructure breaks 467 disposed at substructure separating portions 466. In this embodiment, various extension depths may be utilized by breaking a desired number of extension substructures at the appropriate substructure break. As described above for the embodiment shown in FIG. 4a, a wide variety of shapes and sizes may be utilized to form extension substructures 419a'-419c', as well as a wide variety of break structures also may be utilized to form substructure breaks 467.

Figure 5:
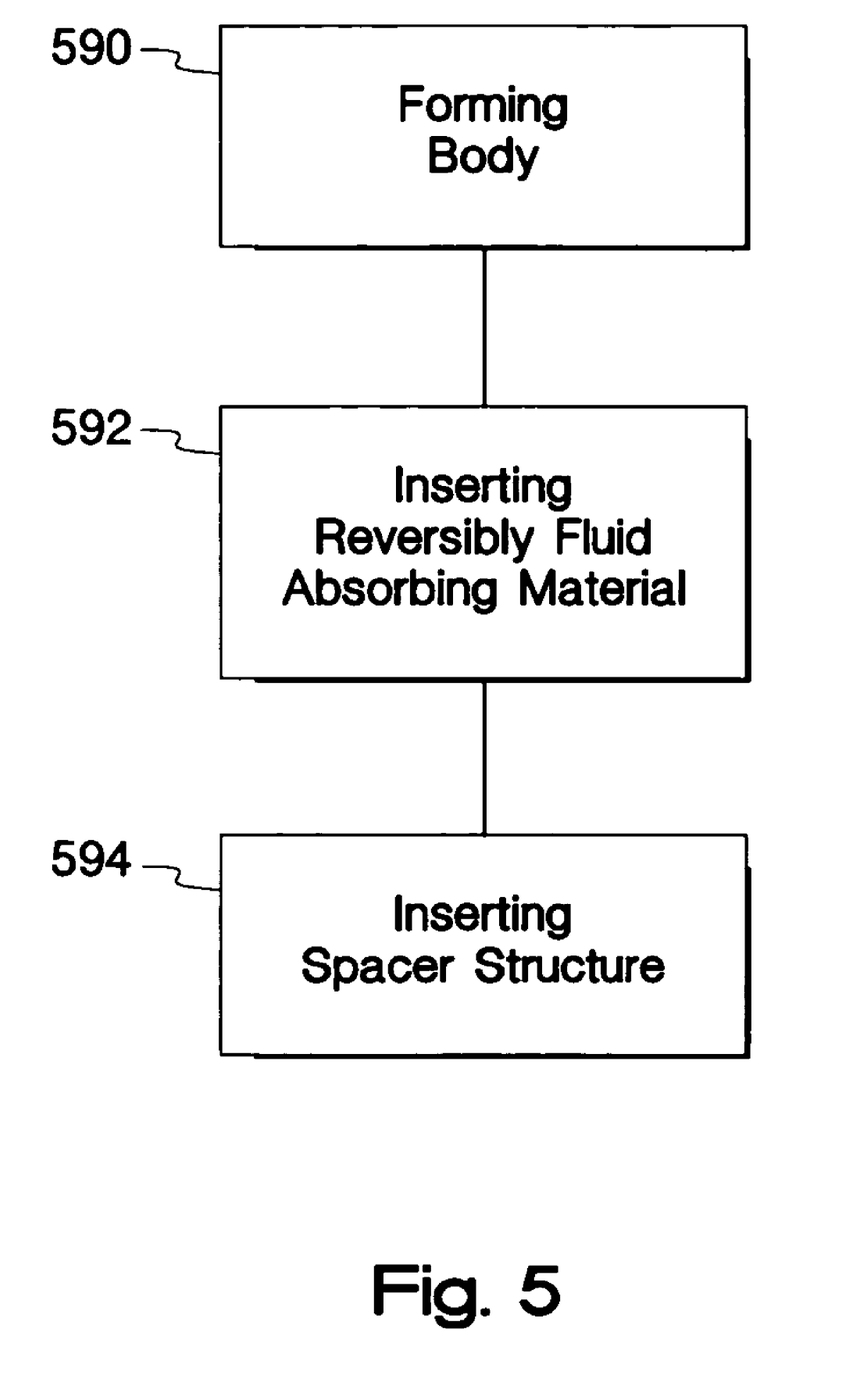
FIG. 5 is a flow chart of a method of making a fluid container according to an embodiment of the present invention.

A flow chart of a method of making a fluid container according to an embodiment of the present invention is shown in FIG. 5. In this embodiment, body forming process 590 is utilized to form the body of a fluid container that may be a fluid supply, a fluid ejection cartridge, a combination of both or other device that utilizes a fluid. Generally, the body forming process utilizes injection molding, however, a wide variety of processes such as blow molding, thermoforming, compression molding, or simple assembly and sealing techniques may be utilized to form the body of the fluid container. Body forming process 590 includes forming a body that includes a base surface and/or a compression edge on which a capillary or reversibly fluid absorbing material rests. The body has a body volume that is capable of holding a desired maximum capillary fluid volume above the base surface. In addition, the body also includes an opening through which the reversibly fluid absorbing material may be inserted.

Reversibly fluid absorbing material insertion process 592 is utilized to insert, through the opening formed in the body, a piece of reversibly fluid absorbing material until the material rests against the base surface and/or a compression edge. The piece of reversibly fluid absorbing material has a fluid absorbing material volume that is less than or equal to 80 percent of the desired maximum capillary fluid volume of the body.

Spacer structure insertion process 594 is utilized to insert, a spacer structure or lid extension structure through the opening formed in the body until the spacer structure or lid extension structure contacts the reversibly fluid absorbing material. The spacer structure includes a spacer structure depth that effectively displaces at least about 20 percent of the capillary fluid volume of the body.

Figure 6A:
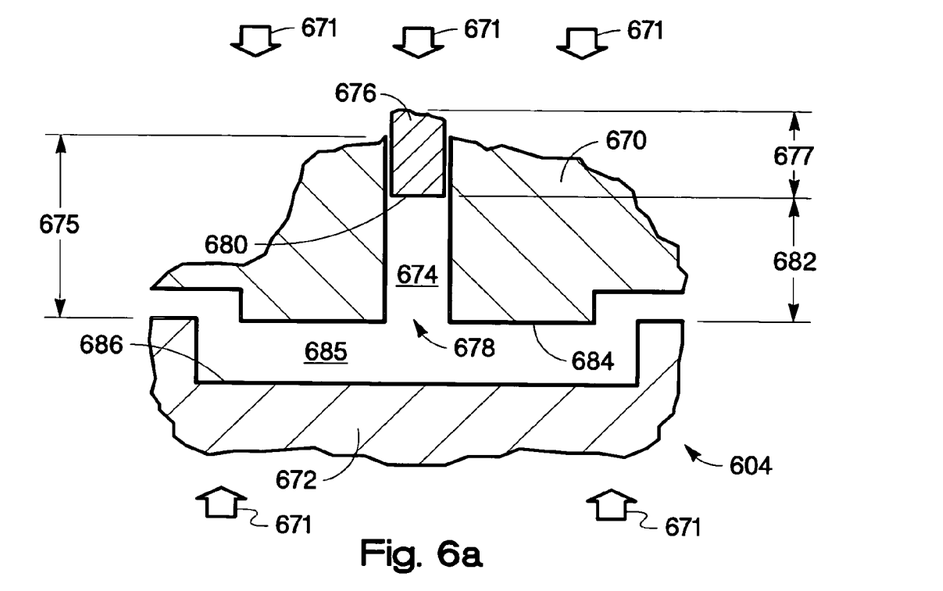
FIGS. 6a-6c are exemplary cross-sectional views of a process utilized to create embodiments of the present invention.
Figure 6B:
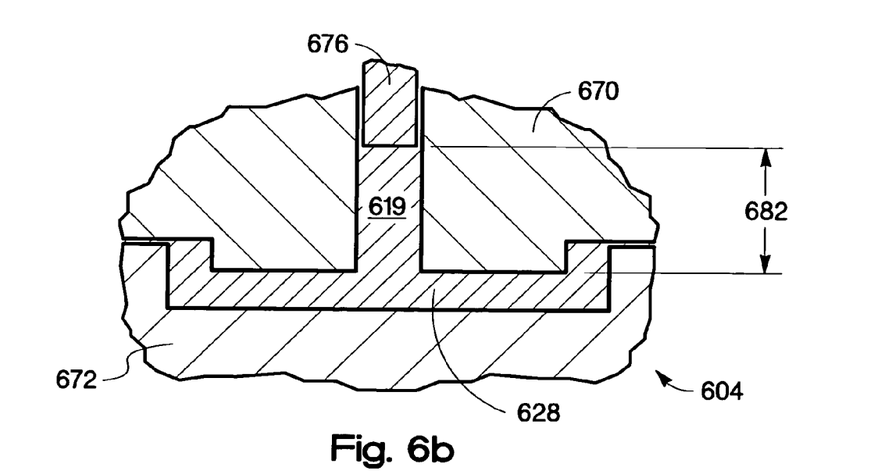
Figure 6C:
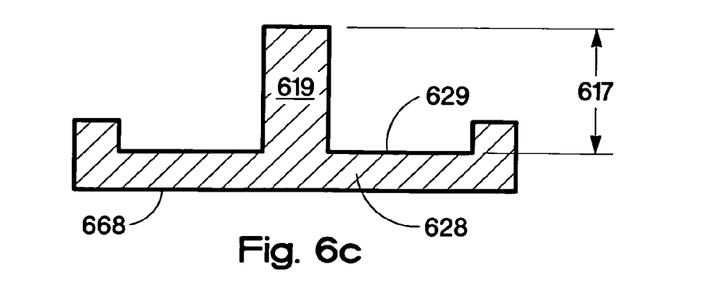

An exemplary method of making a lid for a fluid container or a cartridge crown for a fluid ejection cartridge utilizing an injection molding process is shown, in a series of cross-sectional views, in FIGS. 6a-6c. As illustrated in FIG. 6a, this embodiment utilizes two-plate mold 604, i.e. first mold portion 670 and second mold portion 672; however, in alternate embodiments three-plate molds also may be utilized. At least one ejector pin bore 674 is formed in first mold portion 670. Ejector pin bore 674 extends through first mold portion 670 and forms bore opening 678 that is substantially flush with first mold surface 684. In addition, ejector pin bore has bore length 675 extending from first mold surface 684 to an opposing surface (not shown). In this embodiment first mold surface 684 is shaped to form major interior surface 629 of the fluid container lid or cartridge crown 628 as illustrated in FIG. 6c. First mold portion 670 also includes ejector pin 676 disposed in ejector pin bore 674. Ejector pin 676 includes ejection end 680 and pin length 677. Second mold portion 672 includes second mold surface 686 shaped to form major exterior surface 668 of the fluid container lid or cartridge crown 628.

As illustrated in FIG. 6a fluid container lid or cartridge crown 628 is fabricated by urging (represented by arrows 671) first mold portion 670 toward second mold portion 672 to form mold cavity 685. After mold cavity 685 is formed a lid material is injected into the mold cavity through an injection nozzle (not shown) to form fluid container lid or cartridge crown 628 as illustrated in FIG. 6b. In this embodiment, mold cavity 685 also includes the volume of ejector pin bore 674 between ejection end 680, of ejector pin 676, and bore opening 678 where ejection end 680 is recessed a pre-selected distance 682 from bore opening 678. For example, in one exemplary embodiment ejection end 680 is recessed at least 10 millimeters from bore opening 678. During injection of the lid material the lid material will flow through the bore opening and fill the volume of ejector pin bore 674 between the ejection end and the bore opening to form lid extension structure 619 as illustrated in FIGS. 6*b* and 6*c*. By varying preselected distance 682 the same mold can be utilized to form fluid container lid or cartridge crown 628 having protrusions 619 with various protrusion lengths 617 as shown in FIG. 6*c*. These lids or crowns can then be utilized to fabricate fluid containers and fluid ejection cartridges optimized for various fluid fill factors. By utilizing the same mold to form multiple different lids or crowns having different length protrusions the manufacturing costs for a particular fluid container or fluid ejection cartridge are lowered.

What is claimed is:

1. A fluid container, comprising:
   a body having a depth extending between a base interior surface and an opening of the fluid container;
   a capillary material within said body in contact with said base interior surface; and
   a capillary material compression structure having an extension depth extending from said opening to said capillary material, said capillary material compression structure extending across an internal body length and an internal body width of said body, and said capillary material compression structure including a plurality of extension structures each extending into said body and each having a free end contacting said capillary material,
   wherein each of said extension structures comprises at least two extension substructures attached to each other, each extension substructure having a substructure length such that said extension depth of said capillary material compression structure is equal to a sum of said substructure lengths.

2. The fluid container in accordance with claim 1, wherein said capillary material has a constant capillary material length, a constant capillary material width, and a constant capillary material thickness.

3. The fluid container in accordance with claim 1, wherein said depth, said internal body length, and said internal body width form a maximum effective capillary fluid volume of the fluid container, and wherein said extension depth, said internal body length, and said internal body width form an effective displaced volume, wherein said effective displaced volume is greater than or equal to 20 percent of said maximum effective capillary fluid volume.

4. The fluid container in accordance with claim 1, further comprising:
   a maximum effective capillary fluid volume; and
   a capillary fluid volume defined by a capillary material length, capillary material width and a thickness of said capillary material, said thickness is equal to the difference between said depth and said extension depth, wherein said capillary fluid volume is less than or equal to 80 percent of said maximum effective capillary fluid volume.

5. The fluid container in accordance with claim 1, wherein said capillary material compression structure further comprises a lid having said extension structures attached thereto, said extension structures having said extension depth extending from an interior surface of said lid to said capillary material.

6. The fluid container in accordance with claim 1, wherein said at least two extension substructures of each of said extension structures extend along a common longitudinal axis, and said substructure length of each of said extension substructures extends along said common longitudinal axis.

7. The fluid container in accordance with claim 1, further comprising a substructure separating portion disposed between said at least two extension substructures of each of said extension structures, wherein a first of said extension substructures is sequentially separated from a second of said extension substructures at said substructure separating portion.

8. The fluid container in accordance with claim 7, wherein said substructure separating portion comprises a substructure break.

9. The fluid container in accordance with claim 7, wherein said substructure separating portion comprises an area of reduced dimension relative to at least one adjacent extension substructure.

10. The fluid container in accordance with claim 7, wherein one or more of said extension substructures is separated from said capillary material compression structure at said substructure separating portion to adjust said extension depth.

11. The fluid container in accordance with claim 1, further comprising a fluid impervious film encapsulating said capillary material.

12. A fluid ejection cartridge, comprising:
   a fluid container of claim 1; and
   a fluid ejector head disposed on said body, wherein said fluid ejector head is configured to be in fluid communication with a fluid contained in said capillary material.

13. The fluid container in accordance with claim 1, wherein the ratio of said extension depth to said depth is 0.35 or greater.

14. The fluid container in accordance with claim 1, wherein a diameter of a first of said extension substructures is less than a diameter of a second of said extension substructures.

15. A fluid container, comprising:
   a body having a base surface, a reversibly fluid absorbing material volume, and an opening, said opening adapted to receive a fluid container lid, said reversibly fluid absorbing material volume disposed between said base surface and said opening;
   a reversibly fluid absorbing material within said reversibly fluid absorbing material volume; and
   a reversibly fluid absorbing material spacer structure extending from said opening toward said base surface, said reversibly fluid absorbing material spacer structure extending along an internal length and an internal width of said body, and said reversibly fluid absorbing material spacer structure including a plurality of extension structures each extending into said body and each having a free end contacting said reversibly fluid absorbing material,
   wherein each of said extension structures comprises at least two extension substructures attached to each other at a substructure separating portion, each of said at least two extension substructures having a substructure length and extending along a common longitudinal axis.

16. A fluid ejection cartridge, comprising:
   a fluid container of claim 15; and
   a fluid ejector head disposed on said body, wherein said fluid ejector head is configured to be in fluid communication with a fluid contained in said reversibly fluid absorbing material.

17. The fluid container in accordance with claim 15, said reversibly fluid absorbing material spacer structure effectively displacing at least about 20 percent of said reversibly fluid absorbing material volume.

18. The fluid container in accordance with claim 15, wherein a first of said extension substructures of said at least two extension substructures is separated from a second of said extension substructures of said at least two extension substructures at said substructure separating portion.

19. The fluid container in accordance with claim 15, wherein one or more of said extension substructures is separated from a respective one of said extension structures at said substructure separating portion to adjust an extension depth of said reversibly fluid absorbing material spacer structure from said opening toward said base surface.

20. A method of manufacturing a fluid container, comprising:
   forming a body having a base surface and a maximum capillary fluid volume disposed between said base surface and an opening of said body;
   inserting a reversibly fluid absorbing material into said opening, said reversibly fluid absorbing material disposed between said base surface and said opening; and
   inserting a spacer structure into said opening, said spacer structure extended along an internal length and an internal width of said body, and said spacer structure including a plurality of extension structures each extending into said body and each having a free end contacting said reversibly fluid absorbing material,
   wherein each of said extension structures comprises at least two extension substructures each having a substructure length extended along a common longitudinal axis into said body.

21. The method of manufacturing a fluid container in accordance with claim 20, wherein inserting said spacer structure further comprises attaching a lid to said body, thereby enclosing said opening, said lid having said extension structures attached thereto.

22. The method of manufacturing a fluid container in accordance with claim 20, further comprising sequentially separating at least one extension substructure from another extension substructure at a substructure separating portion, wherein each of said extension structures includes at least two extension substructures.

23. A method of manufacturing a fluid ejection cartridge, comprising:
   manufacturing a fluid container in accordance with claim 20; and
   forming a fluid ejector head disposed on said body, wherein said fluid ejector head is configured to be in fluid communication with a fluid contained in said reversibly fluid absorbing material.

24. The method of manufacturing a fluid container in accordance with claim 20, wherein said reversibly fluid absorbing material has a constant length, a constant width, and a constant thickness.

25. The method of manufacturing a fluid container in accordance with claim 20, said reversibly fluid absorbing material occupying no more than 80 percent of said maximum capillary fluid volume, and said spacer structure effectively displacing at least about 20 percent of said maximum capillary fluid volume.

26. The method of manufacturing a fluid container in accordance with claim 20, wherein said at least two extension substructures are attached to each other at a substructure separating portion, and further comprising:
   before inserting said spacer structure into said opening, separating a first of said extension substructures from a second of said extension substructures at said substructure separating portion to adjust an extension depth of said spacer structure into said body.

27. The method of manufacturing a fluid container in accordance with claim 26, wherein said substructure separating portion comprises an area of reduced dimension relative to at least one adjacent extension substructure.

28. A method of manufacturing a fluid container, comprising:
   forming a body having a base surface and a maximum capillary fluid volume disposed between said base surface and an opening of said body;
   inserting a reversibly fluid absorbing material into said opening, said reversibly fluid absorbing material disposed between said base surface and said opening; and
   inserting a spacer structure into said opening after said reversibly fluid absorbing material has been inserted into said opening, said spacer structure extended across an internal length and an internal width of said body, and said spacer structure including a plurality of extension structures each extending into said body and each having a free end contacting said reversibly fluid absorbing material,
   wherein each of said extension structures comprises at least two extension substructures each attached to the other and having a substructure length such that an extension depth of said spacer structure into said body is equal to a sum of said substructure lengths.

29. The method of manufacturing a fluid container in accordance with claim 28, said reversibly fluid absorbing material occupying no more than 80 percent of said maximum capillary fluid volume, and said spacer structure effectively displacing at least about 20 percent of said maximum capillary fluid volume.

30. The method of manufacturing a fluid container in accordance with claim 28, wherein said at least two extension substructures of each of said extension structures extend along a common longitudinal axis, and said substructure length of each of said extension substructures extends along said common longitudinal axis.

31. The method of manufacturing a fluid container in accordance with claim 28, wherein said at least two extension substructures are attached to each other at a substructure separating portion, and further comprising:
   before inserting said spacer structure into said opening, separating a first of said extension substructures from a second of said extension substructures at said substructure separating portion to adjust said extension depth of said spacer structure into said body.

* * * * *